US009938916B2

(12) United States Patent
Giovaresco et al.

(10) Patent No.: US 9,938,916 B2
(45) Date of Patent: Apr. 10, 2018

(54) SYSTEM AND METHOD FOR ADJUSTING CONTROL PARAMETERS OF AN ONBOARD CONTROL DEVICE IN AN AUTOMOTIVE VEHICLE (75) Inventors: Florent Giovaresco, Claix (FR); Peter Osterberg, Ternay (FR); Mathieu Rault, Saint Genis Laval (FR)

(73) Assignee: Volvo Truck Corporation, Göteborg (SE)

(*) Notice: Subject to any disclaimer, the term of this patent is extended or adjusted under 35 U.S.C. 154(b) by 899 days.

(21) Appl. No.: 12/671,267

(22) PCT Filed: Aug. 16, 2007

(86) PCT No.: PCT/IB2007/003267
§ 371 (c)(1),
(2), (4) Date: Jan. 29, 2010

(87) PCT Pub. No.: WO2009/022194
PCT Pub. Date: Feb. 19, 2009

(65) Prior Publication Data
US 2010/0204882 A1 Aug. 12, 2010

(51) Int. Cl.
*G06F 7/00* (2006.01)
*F02D 41/02* (2006.01)
(Continued)

(52) U.S. Cl.
CPC ......... *F02D 41/021* (2013.01); *B60W 50/045* (2013.01); *F02D 41/2429* (2013.01);
(Continued)

(58) Field of Classification Search
USPC ............................................... 701/414–416
See application file for complete search history.

(56) References Cited

U.S. PATENT DOCUMENTS 5,204,814 A * 4/1993 Noonan ............... A01D 34/008
180/168
5,983,156 A 11/1999 Andrews
(Continued)

FOREIGN PATENT DOCUMENTS

EP 0919419 A 6/1999
EP 0934858 B1 8/1999
(Continued)

OTHER PUBLICATIONS

Japanese Official Action from corresponding Japanese Application 2010-520638, dated Mar. 7. 2012 (translation).
(Continued)

*Primary Examiner* — Robert W Morgan
*Assistant Examiner* — Rajiv J Raj
(74) *Attorney, Agent, or Firm* — WRB-IP LLP (57) ABSTRACT This system is used for adjusting the control parameters of an onboard electronic control device of an automotive vehicle in view of a journey or type of journey. This system includes a computation arrangement adapted to generate a set of control parameters to be used by the electronic control device and an input arrangement adapted to allow a user to provide the computation arrangement with data relating to the journey or type of journey and to at least one constraint to be considered as having priority during the journey or type of journey. In the method of the invention, one collects data with respect to the vehicle, to the journey or type of journey and to the constraint to be considered as having priority. These data are provided to the computation arrangement which generate a set of control parameters for the control device.

28 Claims, 4 Drawing Sheets (51) Int. Cl.

| | |
|---|---|
| *B60W 50/04* | (2006.01) |
| *F02D 41/24* | (2006.01) |
| *F02D 41/26* | (2006.01) |
| *G06F 9/445* | (2018.01) |
| *G07C 5/08* | (2006.01) |
| *B60W 10/06* | (2006.01) |
| *B60W 10/10* | (2012.01) |
| *B60W 30/18* | (2012.01) |
| *B60W 40/02* | (2006.01) |
| *B60W 40/072* | (2012.01) |
| *B60W 40/076* | (2012.01) |
| *B60W 50/00* | (2006.01) |
| *G07C 5/00* | (2006.01) |

(52) U.S. Cl.
CPC ....... *F02D 41/266* (2013.01); *G06F 9/44505* (2013.01); *G07C 5/0808* (2013.01); *B60W 10/06* (2013.01); *B60W 10/10* (2013.01); *B60W 30/18* (2013.01); *B60W 30/18172* (2013.01); *B60W 40/02* (2013.01); *B60W 40/072* (2013.01); *B60W 40/076* (2013.01); *B60W 2050/0077* (2013.01); *B60W 2550/402* (2013.01); *F02D 2200/606* (2013.01); *G07C 5/008* (2013.01)

(56) References Cited

U.S. PATENT DOCUMENTS

| | | | |
|---|---|---|---|
| 6,356,839 B1 * | 3/2002 | Monde | ............... G01C 21/3492 340/995.23 |
| 6,487,717 B1 | 11/2002 | Brunemann | |
| 6,665,606 B2 | 12/2003 | Mathew et al. | |
| 2002/0116116 A1 | 8/2002 | Mathew | |
| 2007/0244635 A1 * | 10/2007 | Asahara | ............. G01C 21/3415 701/416 |

FOREIGN PATENT DOCUMENTS

| | | |
|---|---|---|
| JP | 05058197 | 3/1993 |
| JP | 09147294 | 6/1997 |
| WO | 9821077 | 5/1998 |
| WO | 0217184 A1 | 2/2002 |
| WO | 2004061284 A | 7/2004 |

OTHER PUBLICATIONS

JP 2002-138889, May 17, 2002, Toyotal Motor Corp. Patent Abstracts of Japan, translation, and entire document.
JP 2002-089352, Mar. 27, 2002, Hitachi Ltd, Patent Abstracts of Japan, translation, and entire document.
JP H06-328984, Nov. 29, 1994, Mazda Motor Corp., Patent Abstracts of Japan, translation, and entire document.
JP H02-230403, Sep. 12, 1990, Nissan Motor Co. Ltd., Patent Abstracts of Japan and entire document.
JP 2005-078463, Mar. 24, 2005, A & D Co. Ltd., Patent Abstracts of Japan, translation, and entire document.
JP2004-530174, Sep. 30, 2004 (corresponds to WO0217184).
Japanese Notification of Questioning (May 14, 2013) from corresponding JP Application 2010-520638.
International Search Report for corresponding International Application PCT/IB2007/003267.

* cited by examiner

SYSTEM AND METHOD FOR ADJUSTING CONTROL PARAMETERS OF AN ONBOARD CONTROL DEVICE IN AN AUTOMOTIVE VEHICLE

BACKGROUND AND SUMMARY

This invention concerns a system and a method for adjusting the control parameters of an onboard electronic control device of an automotive vehicle in view of a journey or a type of journey.

Onboard electronic control devices are used on automotive vehicles, in particular on trucks, in order to control equipments or sub-systems such as an internal combustion engine, a gear box or an after-treatment unit which cleans the exhaust gases. Parameters to be used by such an onboard electronic device are usually set in the vehicle manufacturer factory with average values. Such average values are not optimized in view of a predetermined journey or type of journey to be made with a vehicle. It is known from U.S. Pat. No. 6,665,606 to send from a server some data to an onboard electronic control unit in order to bring back a specific engine in line with statistic mean parameters. It is also known from U.S. Pat. No. 6,487,717 to upgrade an engine electronic control unit via the Internet, with the possibility to optimize a truck engine according to its region of operation.

In some cases, a driver or a fleet manager wishes to emphasize one aspect of the panning conditions of a vehicle, in particular a truck, on a given journey or type of journey. For instance, if during a given journey a truck is supposed to cross a country where anti-pollution regulations are very strict, a fleet manager might wish to optimize the level of $CO_2$, $NO_x$ or soot emissions. Alternatively, the fleet manager might consider fuel consumption on a given journey, i.e. for a specific duty-cycle, as an essential issue. For safety reasons, it can also be useful to consider the maximum speed of a truck during a given journey as a key point. The driver might consider that the trip time is an essential feature of his journey. Known systems and methods do not allow to take such wishes into account.

This invention aims at providing a system and a method which are efficient to customize the running conditions of a vehicle, in particular a truck, in order to adapt such running conditions to a given journey or type of journey and to a specific constraint chosen by a user which can be a fleet manager or a driver, for example.

To this purpose, the invention concerns a system for adjusting the control parameters of an onboard electronic control device of an automotive vehicle in view of a journey or type of journey, characterized in that said system includes: computation means adapted to generate a set of control parameters to be used by said electronic control device, and input means adapted to allow a user to provide said computation means with data relating to said journey or type of journey and to at least one constraint to be considered as having priority during said journey or type of journey.

Thanks to the invention, the user can input into the computation means some information with respect to a specific constraint to be followed during a given journey or type of journey, which allows the onboard electronic control device to control the equipments and systems of the vehicle in a way which guarantees that the specific constraint is fulfilled. For instance, if the user considers the fuel consumption as a constraint having priority for one given journey, he/she can forward the corresponding information, via the input means, to the computation means which will generate a set of control parameters optimizing the fuel consumption of the vehicle for this journey, once loaded in its electronic control device. Optimization of the fuel consumption can be obtained by modifying the parameters of the fuel injection system and/or the gear ratio of an automatic or robotized gear box.

According to further aspects of the invention, an adjusting system—might incorporate one or several of the following features:—The system includes data collection means with respect to the vehicle and means to provide the computation means with this vehicle data.

- The computation means are located remotely from the vehicle and the system also includes communication means between the input means and the computation means. In such a case, the computation means advantageously include several models corresponding to several vehicles and they are adapted to select one model on the basis of data relating to the vehicle.
- Alternatively, the computation means are located onboard the vehicle and dedicated to the vehicle.
- The computation means include a data base storing information used by the computation means to simulate the journey or type of journey, on the basis of the journey/type of journey data received from the input means.
- The input means comprise a personal computer forming a user interface, this computer having communication means with the computation means and/or with the vehicle or including the computation means.
- The system includes means for direct data exchange between the vehicle and the computation means.

This invention also concerns a method for adjusting the control parameters of an onboard electronic control device of an automotive vehicle in view of a journey or type of journey, characterized in that it comprises at least the following steps of: a) collecting data with respect to the vehicle, b) collecting data with respect to the journey or type of journey, c) collecting data with respect to at least one constraint to be considered as having priority, d) providing computation means with the collected data, e) generating with said computation means, a set of control parameters for said onboard control device, said parameters being dedicated to said journey or type of journey and giving priority to said constraint, and f) loading said onboard control device with said set of control parameters.

According to further aspects of this invention, this method might incorporate one or several of the following features:

- The vehicle data collected in step a) include a vehicle identification number corresponding to a set of data present in a database belonging to the computation means.
- The vehicle data collected in step a) include data retrieved from the vehicle control device.
- All the vehicle data collected in step a) are provided to said computation means via an interface computer. As an alternative, at least a part of the vehicle information data collected in step a) is sent directly from the vehicle to the computation means.
- After step e), the computation means send the set of control parameters to an interface computer and this set of control parameters is loaded into the onboard control device from this interface computer. Alternatively, after step e), the set of control parameters is sent directly by the computation means to the onboard control device.
- The constraint to be considered as having priority is selected from fuel consumption, journey time, average speed, maximum speed, maximum acceleration, noise levels, emission levels and maintenance interval forecast.

During step e), the computation means build a model of the journey or type of journey on the basis of the data collected in step b) and of information contained in at least one database.

During step e), the computation means build a model of the vehicle on the basis of the data collected in step a) and of information contained in at least one database. In such a case, this database preferably includes data collected from a vehicle manufacturer and/or from a vehicle maintenance system.

BRIEF DESCRIPTION OF THE DRAWINGS

The invention will be better understood on the basis of the following description which is given in correspondence with the annexed figures and as an illustrative example, without restricting the invention which is defined by the appended claims. In the annexed figures:

DETAILED DESCRIPTION

Figure 1:
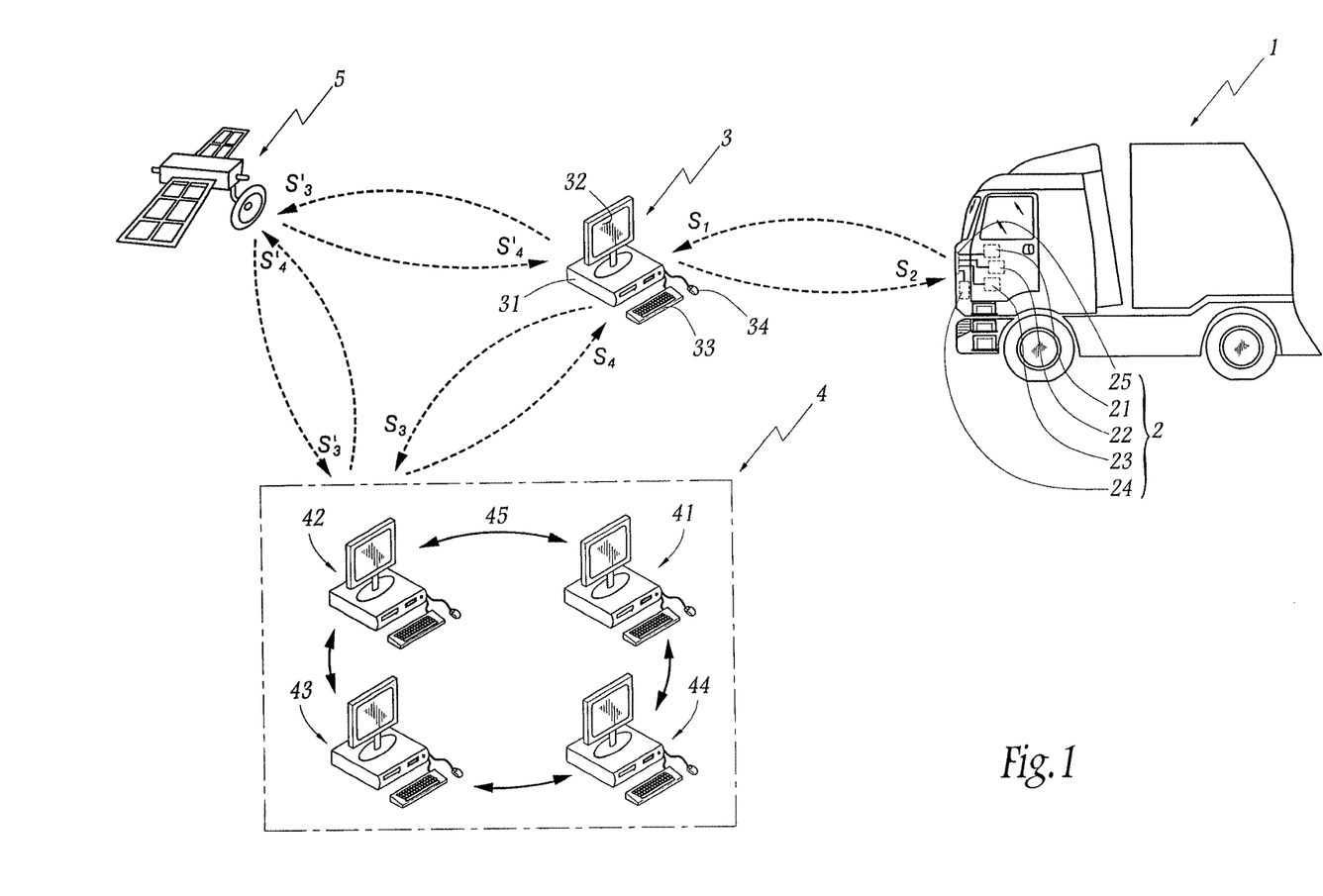
FIG. 1 is a schematic view of a system according to the invention used with a truck.

A truck 1 is provided with an onboard electronic control device 2 which comprises a main electronic control unit or ECU 21 and three ECUs 22 to 24 which respectively control an internal combustion engine, an automatic gear box and an exhaust gas treatment equipment of truck 1. Device 2 also includes a communication module 25 connected to ECUs 21 to 24 and adapted to exchange data with a personal computer 3. For instance, module 25 can send a radio signal S1 to computer 3 and receive another radio signal S2 coming from this computer.

Communication between module 25 and computer 3 can also be made via an electric wire plugged into module 25 when truck 1 reaches a maintenance facility including computer 3. Communication between device 2 and computer 3 can also occur via an USB stick which can be loaded with data to be transferred from device 2 to computer 3 and vice versa.

Computer 3 includes a central unit 31, a screen 32, a keyboard 33 and a mouse 34. Computer 3 is adapted to communicate, with a central computing facility 4 which includes several computers 41, 42, 43 and 44 connected by a local network 45. An electronic signal S3 can be sent from computer 3 to facility 4 and an electronic signal S4 can be sent from facility 4 to computer 3. These signals preferably go through the Internet. However, other communication routes can be chosen, e.g. a communication system using a satellite 5, as shown by signals S'3 and S'4, or non represented radio antennas.

Figure 2:
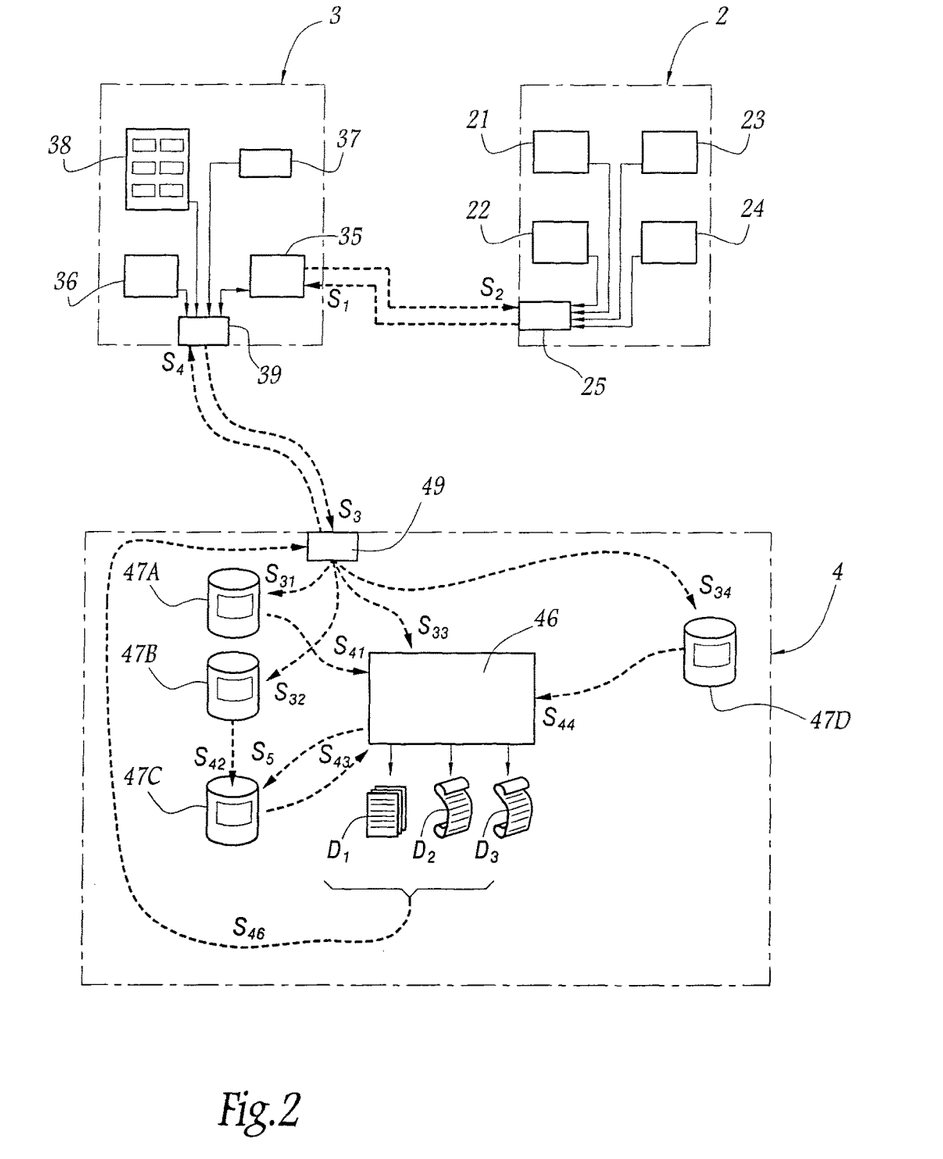
FIG. 2 is a flowchart showing data transfer with a method of the invention.

One considers here that truck 1 belongs to a fleet of trucks handled by a fleet manager having access to computer 3. When the fleet manager knows that truck 1 is supposed to run a predetermined journey, e.g. going from city A to city B by a given route, the fleet manager can input the corresponding data in computer 3 via keyboard 33 and/or mouse 34. This is made in a first step 1001 of the method of the invention.

In another step 1002, the fleet manager also inputs in computer 3 an identification number which is unique for each truck, so that truck 1 is identified by computer 3 as selected to run the predetermined journey. This unique identification number can be an alphanumerical chain of characters allotted by the truck manufacturer during construction of the truck. It can also be the truck plate number or a number given by the fleet manager. In FIG. 2, box 36 represents a zone of the computer memory where the data input by the user with respect to the journey to be done are stored as a consequence of step 1001. Box 37 represents a part of the computer memory where the specific vehicle identification number is stored as a result of step 1002.

In another step 1003, computer 3 sends to module 25 a challenge signal in order to collect data from device 2. Upon reception of the challenge signal, units 21 to 24 send via module 25 the requested data, as a first radio signal Si, to a logged data communication module 35 of computer 3. The data transmitted from device 2 to computer 3 might include some information coming from the main ECU 21 and relating to the driver and diagnostic of truck 1. The data delivered by unit 22 may include information with respect to the engine usage, temperature of functionment, maximum and normal torque, engine performance, engine emissions and engine wear. The information delivered by ECU 23 may include data relating to gear changes and clutch degradation. The information delivered by unit 24 includes data relating to the urea injection system, the Diesel Particulate Filer or DPF system and the exhaust line. Of course, other data than the one listed here-above can be incorporated into this compilation. The information provided by device 2 to computer 3 constitutes a vehicle log data compilation.

In another step 1004, a specific constraint is selected by the user as having priority on other constraints belonging to a list of constraints 38 stored in computer 3. For example, the constraint chosen by the user might be fuel consumption on the journey to be made by truck 1. Actually, the constraints selected by the user as having priority can be selected from the following list: fuel consumption, journey time, average speed, maximum speed, maximum acceleration, noise levels, emission levels ($CO_2$, $NOx$ and/or particulate matter), and maintenance interval forecasts. Of course, other constraints might be considered, depending on the use and type of the vehicle concerned. Also, a constraint can consist in or comprise an optimum value for a number of variables, such as for example an optimum speed/consumption ratio. Such optimum ratio can for example be defined as the operating point where each variable is within a certain percentage of its best value. Also, it may be possible to define a constraint not only by the variable which it concerns, but also by the severity of the constraint. For example, maximum speed may be prioritized e.g. to the absolute maximum speed, or only to some percentage of that maximum speed, for example 95 percent. The order of steps 1001 to 1004 listed here-above is indicative. Steps 1001 to 1004 can occur in any order and/or in parallel to each other.

Once data have been collected in steps 1001 to 1003 and the preferred constraint has been indicated by the user in step 1004 as explained here-above, the corresponding information is grouped into electronic signal S3 and sent in a further step 1005 by a communication module 39 of computer 3 to a communication module 49 of central computing facility 4.

In a further step 1006, when signal S3 reaches facility 4, it is treated by a computing unit formed by one or several of computers 41 to 44.

Figure 3:
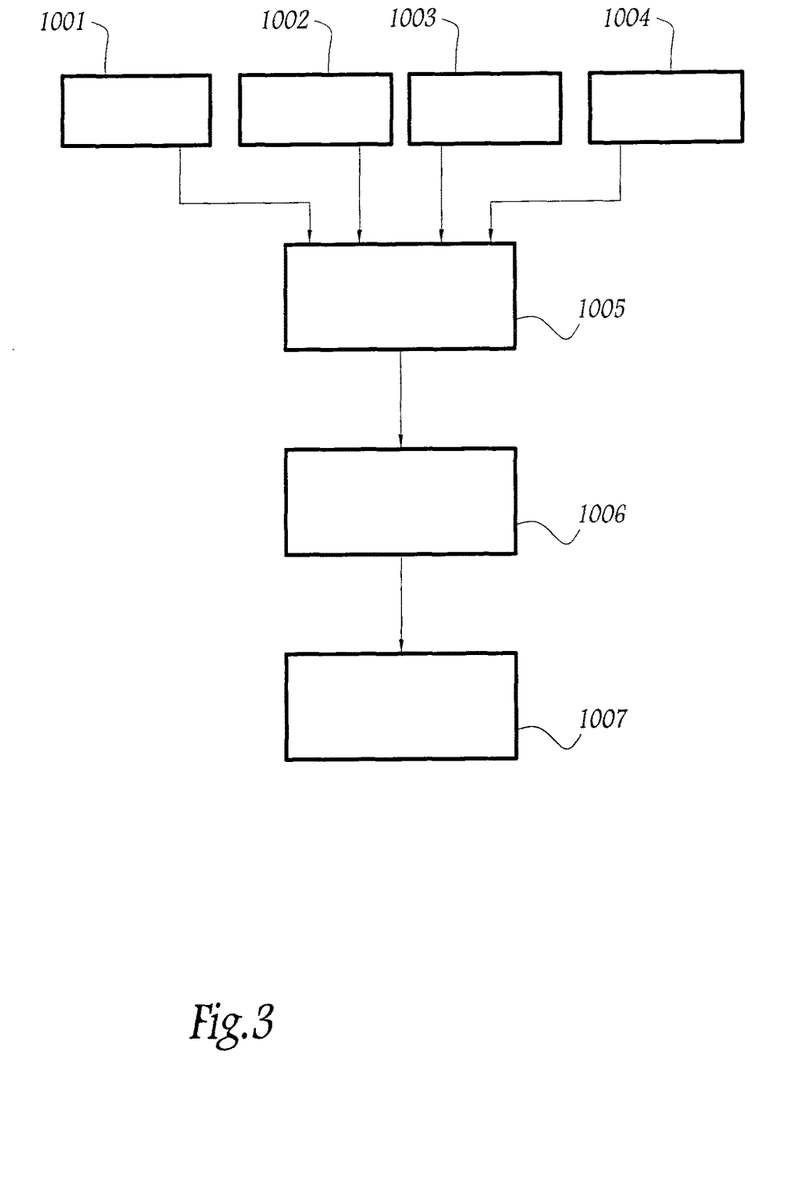
FIG. 3 is a block diagram of the method of the invention referred to in FIG. 2.

A part S31 of signal S3 is used in first database 47A which belongs to facility 4 and includes three-dimensional maps. This allows, on the basis of the information collected during step 1001, to generate a three-dimensional model, which is transferred in an electronic signal S41 to unit 46 and which represents the journey to be followed by truck 1. Signal S4i may include information on distances, slopes, speed limits, road conditions and, possibly, weather conditions on the predetermined journey.

A part S32 of signal S3 is also sent to another database 47B which includes production data from the manufacturer of truck 1. These data allow to retrieve, from the specific vehicle identification number, an equipment configuration corresponding to truck 1. The corresponding information is then sent as a part of an electronic signal S42 to a simulation model database 47C which builds a model of truck 1. This model is forwarded to unit 46 in an electronic signal S43.

Another part S33 of signal S3 is provided directly to unit 46. It includes information with respect to the constraint selected in step 1004 as having priority.

Another part S34 of signal S3 is forwarded to an in-use manufacturer's vehicle database 47D which includes data relating to the evolution in time of the characteristics of truck 1, depending on its wear. In a first approach, one can consider that part S34 of signal S3 sent to database 47D corresponds to the data collected from device 2 and relating to the actual state of truck. On the basis of the data that it receives, database 47D provides unit 46 with an electronic signal S44 including information with respect to the wear of the equipments of truck 1. This can be used by unit 46 to amend the vehicle model included in signal S43.

On the basis of signals S41, S43, S33 and S44, unit 46 generates three sets of data D1, D2 and D3.

Set of data D1 includes adjusted parameters to be used by ECUs 21 to 24 for controlling equipments and sub-systems of truck 1 during the journey to be made. More precisely, the data of set D1 include maps and lists of numbers that will be accessed by ECUs 21 to 24, as variable parameters, in order to perform their controlling functions. These data are elaborated by computing unit 46 while considering the constraint defined in step 1004 as having priority over the other constraints, so that this set of data is dedicated to the journey defined in step 1001, to the truck defined in steps 1002 and 1003 and to the constraint defined in step 1004.

Set D1 is then sent back to communication module 49 as a part of an electronic signal S46 which is forwarded by module 49 to communication module 39 in an electronic signal S4.

Unit 46 may also generate the results of a performance simulation on the journey of the truck. These results are used for driver and/or fleet manager information about the upcoming journey in terms of CO2, Nox, Soot, Fuel Eco, Lead Time, mean/max vehicle speed, as expected with the set constraint. These results form a second set of data D2. If these results are found not to be acceptable, for example because the travel time to obtain the minimum fuel consumption is too long, then the user might change the constraint, for example its severity, to reach a satisfactory set of results, in an iterative process.

Unit 46 may also generate a vehicle maintenance status report, as set of data D3, this report being useful to predict maintenance operations to be made on truck 1 in view of the journey to be made and of the constraint considered as having priority.

Sets of data D1, D2 and D3 may be grouped together within signal S46 and forwarded together to computer 3 within signal S4. When it reaches computer 3, signal S4 is analyzed, and the data relating to sets D2 and D3 are displayed on screen 32, so that the user knows the result of the computation and simulation operated in the central computing facility 4. The user can anticipate maintenance operation on the basis of data set D3. Moreover, data set D1 is sent by module 35 to module 25, as a part of a radio signal S2. Set D1 is then loaded in ECUs 21 to 24 of device 2 as new parameters to be used for controlling equipments and sub-systems of truck 1.

Loading of device 2 with data set D1 takes place in a final step 1007 of the method of the invention.

During step 1006, unit 46 starts by making an evaluation of the fuel consumption, journey time, average speed, noise, emission levels, etc. . . . of the truck during the journey to be done, with the current parameters used by ECUs 21 to 24. Then unit 46 successively modifies these parameters in order to determine their influence on the different constraints to be followed, with a priority given to the constraint indicated by the user at step 1004. These successive computations may also be used by unit 46 to feed database 47C as shown by signal S5 on FIG. 2.

Figure 4:
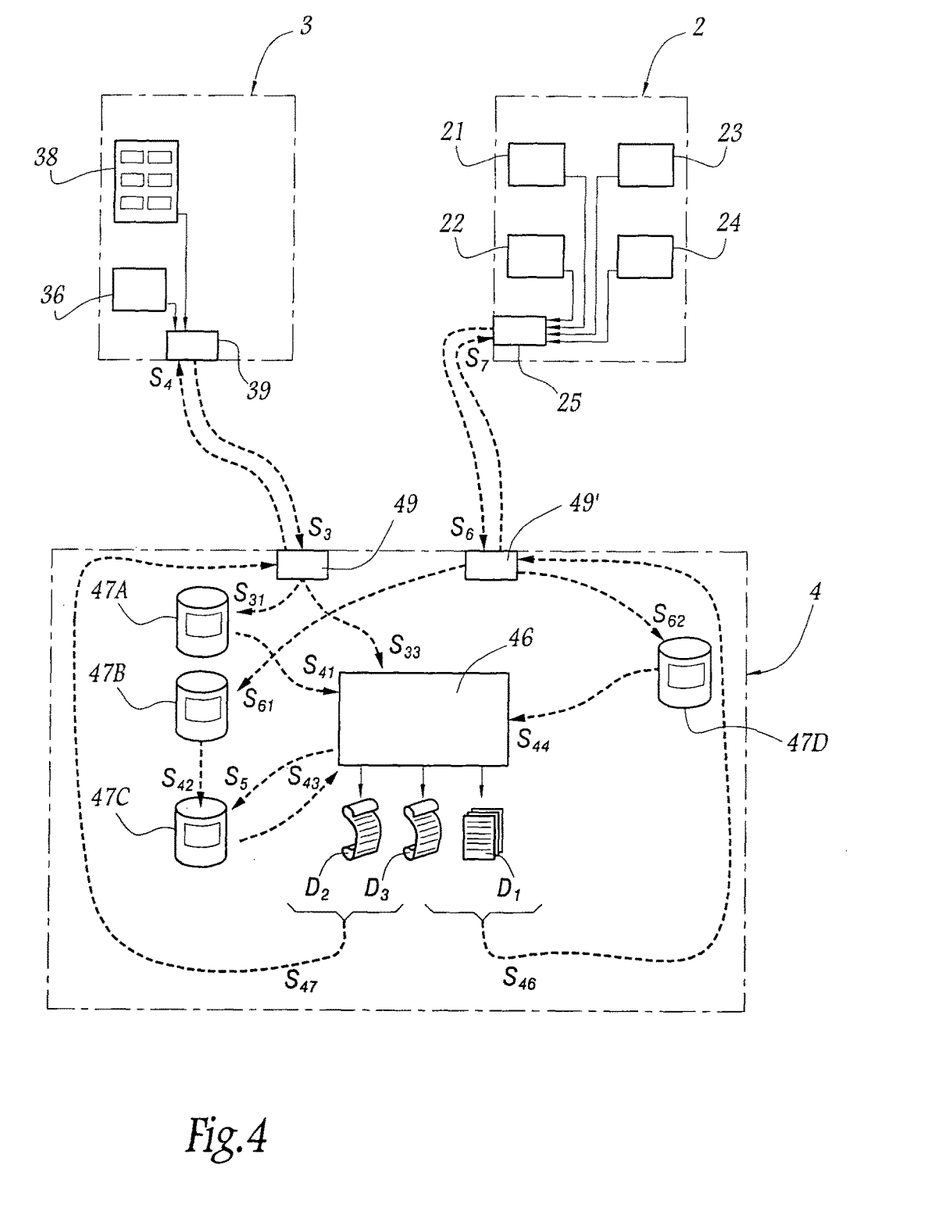
FIG. 4 is a flowchart similar to FIG. 2 for a system corresponding to a second embodiment of the invention.

Reference numerals used in FIG. 4 are the same as in FIG. 2. FIG. 4 relates to an alternative embodiment of the invention where communication between device 2 and facility 4 occurs directly, that is without going through computer 3. In such a case, signal S3 sent by computer 3 to module 49 of central computing facility 4 includes information with respect to the journey and to the constraint to be considered as having priority, whereas another signal S6 is sent by module 25, via a wireless telecommunication system, to another communication module 49' of computing facility 4. Signal S6 includes data relating to truck 1, in particular its specific identification number, together with data mentioned with respect to signal S1 for the first embodiment. Signal S6 is distributed between databases 47B and 47D as shown by signal arrows S6i and S62, whereas signal S3 is distributed between unit 46 and database 47A, as shown by signal arrows S31 and S33. Signal S41, S42, S43 and S44 include information useful for unit 46. They are generated on the basis of information collected in databases 47A, 47B, 47C and 47D, as in the first embodiment.

Three sets of data D1, D2 and D3 are generated by unit 46 as in the first embodiment. The first set of data D1, which is similar to the one of the first embodiment, is sent to module 49' in an electronic signal S46. This signal can be forwarded in a radio signal S7 directly towards communication module 25 of device 2. Sets of data D2 and D3 are sent in an electronic signal S47 to module 49. Signal S47 is included in an electronic signal S4 sent by module 49 to module 39. For the sake of verification and of consistency, set of data D1 can also be included in signal S47 and S4.

In both embodiments described here-above, central computing facility 4 constitutes a back office for a fleet management unit including computer 3 which forms a user interface. According to an alternative embodiment of the invention which is not represented, the computing means of facility 4 can be located in or next to computer 3. In such a case, these computing means are devoted to one fleet of trucks handled by the user of computer 3, whereas, in the two embodiments mentioned here-above, the central computing facility 4 is able to handle data and to make computations for different users having each a computer 3.

In another embodiment which is not represented, the computing means might be installed onboard truck 1. In such a case, ECU 21 or module 25 directly communicates with the computing means and the user interface can be located in the truck cab. The driver is able to indicate, via this onboard interface, the planned journey and the constraint to be considered as having priority. If necessary, the computing means might communicate with a GPS or Global Positioning System in order to determine the characteristics of the journey, which constitutes an alternative to database 47A in the first two embodiments. The invention has been described with respect to the case where a user, a fleet manager or a driver, provides the interface computer with data relating to a specific journey. However, it is also possible for the user to provide this interface computer with a type of journey, that is with general information with respect to the conditions of use of truck 1. For example, the type of journey can be "highway", "urban", "mixed", "high-altitude" or "sea level". Then, the computation means of facility 4 or any other equivalent computer generates a set of control parameters which can be used for all journeys corresponding to the selected type of journey once the constraint having priority has been selected.

The invention has been explained in the case where the computing means, like unit 46, generate the set of control parameters on the basis of models of the truck and the journey. Alternatively, the computation means can generate this set of parameters on the basis of predetermined lists corresponding to predetermined types of journey and predetermined types of vehicle, the choice between the different lists being made while taking into account the constraint to be considered as having priority.

The invention has been described in the case when the user selects one constraint as having priority over the other constraints. However, provided that computing means are powerful enough, it is also possible for the user to select two or more than two constraints having priority. Alternatively, several constraints having different levels of priority can be selected.

The features of all embodiments mentioned here-above can be combined in this invention.

The invention is particularly useful when used with a truck, as explained here-above. It may however be used with a passenger car or any other automotive vehicle.

The invention claimed is:

1. A system comprising:
    an automotive vehicle, the vehicle comprising at least one of an internal combustion engine, an automatic gearbox, and exhaust gas treatment equipment controllable by the control device, and an onboard electronic control device arranged to control at the least one of the internal combustion engine, the automatic gearbox, and the exhaust gas treatment equipment; and
    an arrangement for adjusting control parameters of an onboard electronic control device of an automotive vehicle in view of a journey or type of journey, the arrangement including a computing facility arranged to generate a set of control parameters, distinct from a route of the vehicle, to be used by the electronic control device for controlling at least one of equipment and subsystems of the vehicle, and a user interface arranged to allow a user to provide the computing facility with data relating to the journey or type of journey and to at least one constraint to be considered as having priority during the journey or type of journey, the computing facility being arranged to generate the set of control parameters based on the data provided through the user interface,
    wherein the electronic control device uses the control parameters to control at least one of the internal combustion engine, the automatic gearbox, and the exhaust gas treatment equipment of the vehicle.

2. System according to claim 1, further comprising a communication module with respect to the vehicle and a further communication module to provide the computing facility with the vehicle data.

3. System according to claim 1, wherein the computing facility is located remotely from the vehicle and the system also includes a communication module between the user interface and the computing facility.

4. System according to claim 3, wherein the computing facility includes several models corresponding to several vehicles and is arranged to select one model on the basis of data relating to the vehicle.

5. System according to claim 1, wherein the computing facility is located onboard the vehicle and dedicated to the vehicle.

6. System according to claim 1, wherein the computing facility includes a database storing information used by the computing facility to simulate the journey or type of journey on the basis of the journey/type of journey data received from that user interface.

7. System according to claim 1, wherein the user interface comprises a personal computer forming the user interface, the computer having a communication module for communicating with the computing facility and/or with the vehicle or including the computing facility.

8. System according to claim 1, further comprising a communication module for direct data exchange between the vehicle and the computation facility.

9. System according to claim 1, wherein the electronic control device uses the control parameters to control the internal combustion engine of the vehicle.

10. System according to claim 1, wherein the set of control parameters defines behavior of the at least one of equipment and subsystems.

11. System according to claim 1, wherein the computing facility is arranged to generate, before or at the beginning of the journey, the set of control parameters for controlling equipment and subsystems of the vehicle during the journey to be made.

12. System according to claim 1, wherein the electronic control device uses the control parameters to control at least one of an automatic gearbox, and exhaust gas treatment equipment of the vehicle.

13. A method for adjusting control parameters of an onboard electronic control device of an automotive vehicle in view of a journey or a type of journey, wherein it comprises at least the following steps of:
    a) collecting data with respect to the vehicle,
    b) collecting data with respect to the journey or type of journey,
    c) collecting data with respect to at least one constraint to be considered as having priority,
    d) providing a computing facility with the collected data
    e) generating with the computing facility a set of control parameters for the onboard control device, the parameters being distinct from a route of the vehicle and being for use by one or more ECUs for controlling at least one of equipment and subsystems of the vehicle dedicated to the journey or type of journey and giving priority to the constraint,
    f) loading the onboard control device with the set of control parameters g) using the control parameters to control at least one of an internal combustion engine, an automatic gearbox, and exhaust gas treatment equipment of the vehicle.

14. Method according to claim 13, wherein the vehicle data collected in step a) include a vehicle identification number corresponding to a set of data present in a database belonging to the computing facility.

15. Method according to claim 13, wherein the vehicle data collected in step a) include data retrieved from the vehicle control device.

16. Method according to claim 13, wherein all the vehicle data collected in step a) are provided to the computing facility via an interface computer.

17. Method according to claim 13, wherein at least a part of the vehicle information data collected in step a) is sent directly from the vehicle to the computing facility.

18. Method according to claim 13, wherein after step e), the computing facility sends the set of control parameters to an interface computer and this set of control parameters is loaded into the onboard control device from this interface computer.

19. Method according to claim 13, wherein after step e), the set of control parameters is sent directly by the computing facility to the onboard control device.

20. Method according to claim 13, wherein the constraint to be considered as having priority is selected from fuel consumption, journey time, average speed, maximum speed, maximum acceleration, noise levels, emission levels and maintenance interval forecast.

21. Method according to claim 13, wherein during step e), the computing facility builds a model of the journey or type of journey on the basis of the data collected in step b) and of information contained in at least one database.

22. Method according to claim 13, wherein during step e), the computing facility builds a model of the vehicle on the basis of the data collected in step a) and of information contained in at least one database.

23. Method according to claim 22, wherein the database includes data collected from a vehicle manufacturer and/or from a vehicle maintenance system.

24. Method according to claim 13, comprising using the control parameters to control the internal combustion engine of the vehicle.

25. Method according to claim 13, comprising controlling the at least one of the equipment and subsystems of the vehicle in view of the parameters.

26. Method according to claim 13, wherein the set of control parameters defines behavior of the at least one of equipment and subsystems.

27. Method according to claim 13, comprising generating, before or at the beginning of the journey, the set of control parameters for controlling equipment and subsystems of the vehicle during the journey to be made.

28. Method according to claim 13, comprising using the control parameters to control at least one of an automatic gearbox, and exhaust gas treatment equipment of the vehicle.

* * * * *